(12) United States Patent
Gu

(10) Patent No.: US 9,664,914 B2
(45) Date of Patent: May 30, 2017

(54) LIQUID CRYSTAL GRATING SUBSTRATE, LIQUID CRYSTAL GRATING AND STEREOSCOPIC DISPLAY DEVICE

(71) Applicant: BOE TECHNOLOGY GROUP CO., LTD., Beijing (CN)

(72) Inventor: Yaohui Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 14/437,068

(22) PCT Filed: Oct. 28, 2014

(86) PCT No.: PCT/CN2014/089660
§ 371 (c)(1),
(2) Date: Apr. 20, 2015

(87) PCT Pub. No.: WO2015/143870
PCT Pub. Date: Oct. 1, 2015

(65) Prior Publication Data
US 2016/0291334 A1 Oct. 6, 2016

(30) Foreign Application Priority Data
Mar. 28, 2014 (CN) .......................... 2014 1 0122772

(51) Int. Cl.
*G02B 27/22* (2006.01)
*G02F 1/1343* (2006.01)
(Continued)

(52) U.S. Cl.
CPC ..... *G02B 27/2214* (2013.01); *G02F 1/13439* (2013.01); *G02F 1/13452* (2013.01);
(Continued)

(58) Field of Classification Search
CPC ............... H04N 13/04; H04N 13/0402; H04N 13/0404; H04N 13/0409; H04N 13/0422;
(Continued)

(56) References Cited

U.S. PATENT DOCUMENTS

2008/0218459 A1* 9/2008 Kim ...................... G02F 1/1323
345/87
2011/0001894 A1* 1/2011 Owaku ................. G02F 1/1347
349/15
(Continued)

FOREIGN PATENT DOCUMENTS

CN 201796217 U 4/2011
CN 102289113 A 12/2011
(Continued)

OTHER PUBLICATIONS

English translation of CN 102621737 A, Title: Naked-eye 3D (three dimensional) display module capable of dynamically selecting aperture ratio and liquid crystal display device, Author: Liangkui Song; Date of publication: Aug. 1, 2012.*
(Continued)

*Primary Examiner* — Dung Nguyen
*Assistant Examiner* — Shan Liu
(74) *Attorney, Agent, or Firm* — Nath, Goldberg & Meyer; Joshua B. Goldberg; Christopher Thomas

(57) ABSTRACT

The present invention provides a liquid crystal grating substrate, a liquid crystal grating and a stereoscopic display device The liquid crystal grating substrate, the liquid crystal grating and the stereoscopic display device provided in the present invention can control the voltages of the electrode strips respectively, thereby not only improving the control precision of the liquid crystal grating, but also ensuring diversified control forms to meet various adjustment requirements for the width of the light transmissive area or non-
(Continued)

light transmissive area of the liquid crystal grating; meanwhile, the liquid crystal grating is easy to drive and the sizes of the light transmissive areas can be controlled, thus the circuit design difficulty and the production cost are reduced, and the 3D crosstalk problem can be solved.

15 Claims, 11 Drawing Sheets

(51) Int. Cl.
*G02F 1/1345* (2006.01)
*G02F 1/29* (2006.01)

(52) U.S. Cl.
CPC .......... *G02F 1/134309* (2013.01); *G02F 1/29* (2013.01); *G02F 1/292* (2013.01); *G02F 2001/291* (2013.01)

(58) Field of Classification Search
CPC .......... H04N 13/0431; H04N 13/0434; H04N 13/0436; H04N 13/0438; G02B 6/2713; G02B 5/1828; G02B 26/0808; G02B 5/3016; G02B 5/3083; G02F 1/1326; G02F 1/292; G02F 2201/305; G02F 2203/24; G02F 1/1393; G02F 1/134309; G02F 1/133371; G02F 1/1347; G02F 1/13471; G02F 2203/22; C09K 19/38
USPC .......................................... 349/193, 201–202
See application file for complete search history.

(56) References Cited

U.S. PATENT DOCUMENTS

| | | | | |
|---|---|---|---|---|
| 2011/0043715 | A1* | 2/2011 | Ohyama | G02B 27/2214 349/15 |
| 2013/0201091 | A1* | 8/2013 | Hung | G02B 27/22 345/102 |
| 2013/0257840 | A1 | 10/2013 | Kim et al. | |
| 2013/0257855 | A1 | 10/2013 | Kim et al. | |
| 2013/0308067 | A1* | 11/2013 | Hashimoto | G02B 27/2214 349/15 |
| 2014/0192172 | A1* | 7/2014 | Kang | G02B 27/2214 348/55 |

FOREIGN PATENT DOCUMENTS

| | | | |
|---|---|---|---|
| CN | 102621737 A | * | 8/2012 |
| CN | 202583648 U | | 12/2012 |
| CN | 103941492 A | | 7/2014 |

OTHER PUBLICATIONS

1st office action issued in Chinese application No. 201410122772.2 dated Jan. 29, 2016.
International Search Report dated Oct. 28, 2014 corresponding to International application No. PCT/CN2014/089660.
Written Opinion of the International Searching Authority dated Feb. 3, 2015 corresponding to International application No. PCT/CN2014/089660.

* cited by examiner

-- PRIOR ART --

LIQUID CRYSTAL GRATING SUBSTRATE, LIQUID CRYSTAL GRATING AND STEREOSCOPIC DISPLAY DEVICE

This is a National Phase Application filed under 35 U.S.C. 371 as a national stage of PCT/CN2014/089660, filed Oct. 28, 2014, an application claiming the benefit of Chinese Application No. 201410122772.2, filed Mar. 28, 2014, the content of each of which is hereby incorporated by reference in its entirety.

FIELD OF THE INVENTION

The present invention belongs to the field of display technology, and particularly relates to a liquid crystal grating substrate, a liquid crystal grating and a stereoscopic display device.

BACKGROUND OF THE INVENTION

With the rapid development of stereoscopic display technology, one of the current mainstream naked eye three dimension (3D) display technology is stereoscopic display technology based on parallax, which mainly includes two types: a grating type and a lens array type. With the development of liquid crystal technology, liquid crystal materials are widely used in various fields. A liquid crystal grating is an active grating, which can not only achieve three-dimensional stereoscopic display, but also can switch between three-dimension display and two-dimension (2D) display.

The principle of 3D display using a liquid crystal grating LR will be firstly introduced below with reference to FIG. 1. The liquid crystal grating LR with light transmissive areas distributed at intervals is placed in front of a display panel DP, the liquid crystal grating LR is a "parallax barrier", and an image displayed by the display panel DP includes two signals, namely left eye image information (L) and right eye image information (R).

In a 3D display mode, the left eye image information and the right eye image information of the display panel DP are separated by the liquid crystal grating LR, such that the left eye of a user can only receive the left eye image information while the right eye can only receive the right eye image information, in order to achieve a 3D display effect.

The structure of the liquid crystal grating is as shown in FIG. 2, and sequentially includes the following components from top to bottom: a second polarizing film 21, a second substrate 22, a second electrode structure 23, a second alignment layer 24, a liquid crystal layer 25, a first alignment layer 27, a first electrode structure 26, a first substrate 28 and a first polarizing film 29.

The second substrate 22 and the first substrate 28 are opposite and are arranged in parallel. The second electrode structure 23 is arranged at the inner side of the second substrate 22 (i.e., the side of the second substrate 22 facing to the liquid crystal layer 25), the first electrode structure 26 is arranged at the inner side of the first substrate 28 (i.e., the side of the first substrate 28 facing to the liquid crystal layer 25), the liquid crystal layer 25 is arranged between the second electrode structure 23 and the first electrode structure 26, the second alignment layer 24 is arranged between the liquid crystal layer 25 and the second electrode structure 23, and the first alignment layer 27 is arranged between the liquid crystal layer 25 and the first electrode structure 26. The alignment direction of the second alignment layer 24 is perpendicular to that of the first alignment layer 27, such that liquid crystal molecules 251 in the liquid crystal layer 25 can be aligned.

The second electrode structure 23 is a surface electrode, and the first electrode structure 26 includes a plurality of electrode strips 30 arranged at equal intervals. When the electrode strips 30 of the liquid crystal grating are energized, the liquid crystal molecules 251 corresponding to the electrode strips 30 deflect, while the other liquid crystal molecules 251 do not deflect. At this time, after entering the liquid crystal layer, light will gradually change its polarization direction when passing through the undeflected liquid crystal molecules 251, the vibration direction of polarized light arriving at the first polarizing film 29 is just parallel to the absorption axis of the first polarizing film 29, then the light passes to form the light transmissive area of the liquid crystal grating; when passing through the deflected liquid crystal molecules 251, the light will not change its polarization direction, the vibration direction of the polarized light arriving at the first polarizing film 29 is perpendicular to the absorption axis of the first polarizing film 29, then the light cannot pass and thus a non-light transmissive area of the liquid crystal grating is formed, in this way, the left eye image information and the right eye image information are separated to achieve the 3D display effect.

The driving circuit structure of the existing liquid crystal grating is as shown in FIG. 3 and FIG. 4. FIG. 3 and FIG. 4 respectively represent two different implementation forms of electrode strips 30 and control lines 31, the common ground of the two forms of the driving circuit structures lies in that all the electrode strips 30 of the liquid crystal grating are connected via one control line 31. At a working state, the driving circuit provides the same driving voltage for each electrode strip 30. Although the structure design is easy to drive and control, the width of the light transmissive area or the non-light transmissive area of the liquid crystal grating is difficult to adjust, thus a crosstalk phenomenon is easily occurred.

A liquid crystal grating for solving the crosstalk problem exists in the prior art as well, the schematic diagram of the driving structure thereof is as shown in FIG. 5 and FIG. 6. It is found through comparison between FIGS. 3 and 4 and FIGS. 5 and 6 that, the biggest difference is: there is no longer only one control line 31 in FIG. 5 and FIG. 6, while the electrode strips 30 are connected with the driving circuit of the liquid crystal grating through different control lines 31 to adjust the sizes of the light transmissive areas of the liquid crystal grating, namely, the widths of the light transmissive areas or the non-light transmissive areas of the liquid crystal grating can be controlled by the driving circuit.

Although the liquid crystal grating as shown in FIG. 5 and FIG. 6 can adjust the light transmissive areas of the grating, each electrode strip 30 needs to be provided with one independent control line 31 to be connected with the driving circuit, this not only will increase the difficulty of the manufacturing process, but also will make the driving circuit become more complicated.

To sum up, in the existing liquid crystal grating technology, the driving circuit structure of the liquid crystal grating easy to drive and control cannot adjust the sizes of the light transmissive areas of the grating, while the driving circuit structure of the liquid crystal grating capable of adjusting the sizes of the light transmissive areas of the liquid crystal grating is very complicated.

SUMMARY OF THE INVENTION

The purpose of the present invention is to overcome the problem in the prior art that a liquid crystal grating is difficult to drive or the sizes of the light transmissive areas of the liquid crystal grating cannot be adjusted, the present invention provides a liquid crystal grating which is easy to drive and makes the sizes of the light transmissive areas thereof adjustable.

The technical solution adopted to solve the technical problem in the present invention is a liquid crystal grating substrate, including a driving area used for forming a grating, the liquid crystal grating substrate is provided with a first electrode structure, the first electrode structure includes at least one electrode strip, and each electrode strip includes:

a plurality of connecting parts arranged outside one side of the driving area, a projection part penetrating through the driving area is arranged between every two adjacent connecting parts, and each projection part is provided with two mutually parallel driving parts arranged in the driving area; the driving parts of all the projection parts are mutually parallel; one of the ends of each of the two driving parts in each projection part is connected with one end of an connecting part adjacent thereto;

wherein one end of each electrode strip is a connecting end, the connecting end is used for connecting a driving circuit, and the driving circuit is used for providing a driving voltage for the electrode strip.

Preferably, the first electrode structure includes a plurality of electrode strips, and the projection parts of the plurality of electrode strips are arranged towards the projection directions of the projection parts according to such a sequence that the distances between two driving parts of the projection parts increase sequentially.

Preferably, the distances between the projection parts of every two adjacent electrode strips in the plurality of electrode strips are equal.

Preferably, the distances between the center lines of the adjacent projection parts of the plurality of electrode strips are equal.

Preferably, the connecting parts of all the electrode strips are arranged at one side of the driving area, or connecting parts of a part of the electrode strips are arranged at one side of the driving area, while connecting parts of the rest of the electrode strips are arranged at the other side of the driving area opposite to the one side.

Preferably, the driving circuit configures the voltages of the electrode strips respectively.

Another purpose of the present invention is to provide a liquid crystal grating, including a first substrate and a second substrate, which are arranged oppositely, and a liquid crystal layer arranged between the first substrate and the second substrate, the first substrate is the above-mentioned liquid crystal grating substrate, the second substrate includes a second electrode structure, and an electric field is generated between the second electrode structure and the first electrode structure of the first substrate to drive liquid crystal molecules in the liquid crystal layer to deflect.

Another purpose of the present invention is to provide a stereoscopic display device, including a display panel, wherein the above-mentioned liquid crystal grating is arranged outside the light output surface of the display panel.

The liquid crystal grating substrate, the liquid crystal grating and the stereoscopic display device provided in the present invention can control the voltages of the electrode strips respectively, thereby not only improving the control precision of the liquid crystal grating, but also ensuring diversified control forms to meet various adjustment requirements for the width of the light transmissive area or non-light transmissive area of the liquid crystal grating; meanwhile, the liquid crystal grating is easy to drive and the sizes of the light transmissive areas can be controlled, thus the circuit design difficulty and the production cost are reduced, and the 3D crosstalk problem can be solved.

Figure 1:
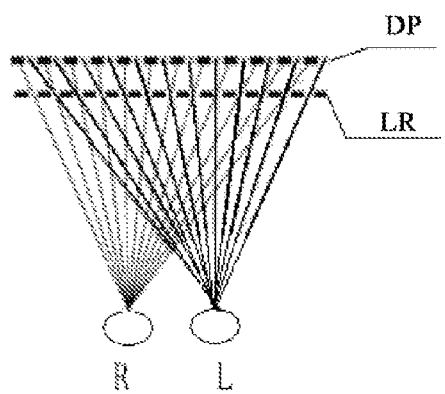
FIG. 1 is a schematic diagram of a light path in 3D display of a stereoscopic display device with a liquid crystal grating in the prior art.

Wherein:

DP. display panel; LR. liquid crystal grating; 21. second polarizing film; 22. second substrate; 23. second electrode structure; 24. second alignment layer; 25. liquid crystal layer; 251. liquid crystal molecule; 26. first electrode structure; 27. first alignment layer; 28. first substrate; 29. first polarizing film; 30. electrode strip; 301. driving part; 302. connecting part; 303. connecting end; 304. projection part; 31. control line; DR. driving area.

DETAILED DESCRIPTION OF THE EMBODIMENTS

To make those skilled in the art better understand the technical solutions of the present invention, the present invention will be further described below in detail in combination with the accompanying drawings and specific implementations.

Embodiment 1

As shown in FIG. 2 and FIGS. 7-9, this embodiment provides a liquid crystal grating substrate, including a driving area DR used for forming a grating. The liquid crystal grating substrate is provided with a first electrode structure 26, the first electrode structure 26 includes a plurality of electrode strips 30, and each electrode strip 30 includes:

a plurality of connecting parts 302 arranged outside one side of the driving area DR, a projection part 304 penetrating through the driving area DR is arranged between every two adjacent connecting parts 302, and each projection part 304 is provided with two mutually parallel driving parts 301 arranged in the driving area DR; one of the ends of each of the two driving parts 301 in each projection part 304 is connected with one end of a connecting part 302 adjacent thereto respectively; the driving parts 301 of all the projection parts 304 are mutually parallel;

wherein one end of each electrode strip 30 is a connecting end 303, which is used for connecting a driving circuit, and the driving circuit is used for providing a driving voltage for the electrode strip 30.

Figure 8:
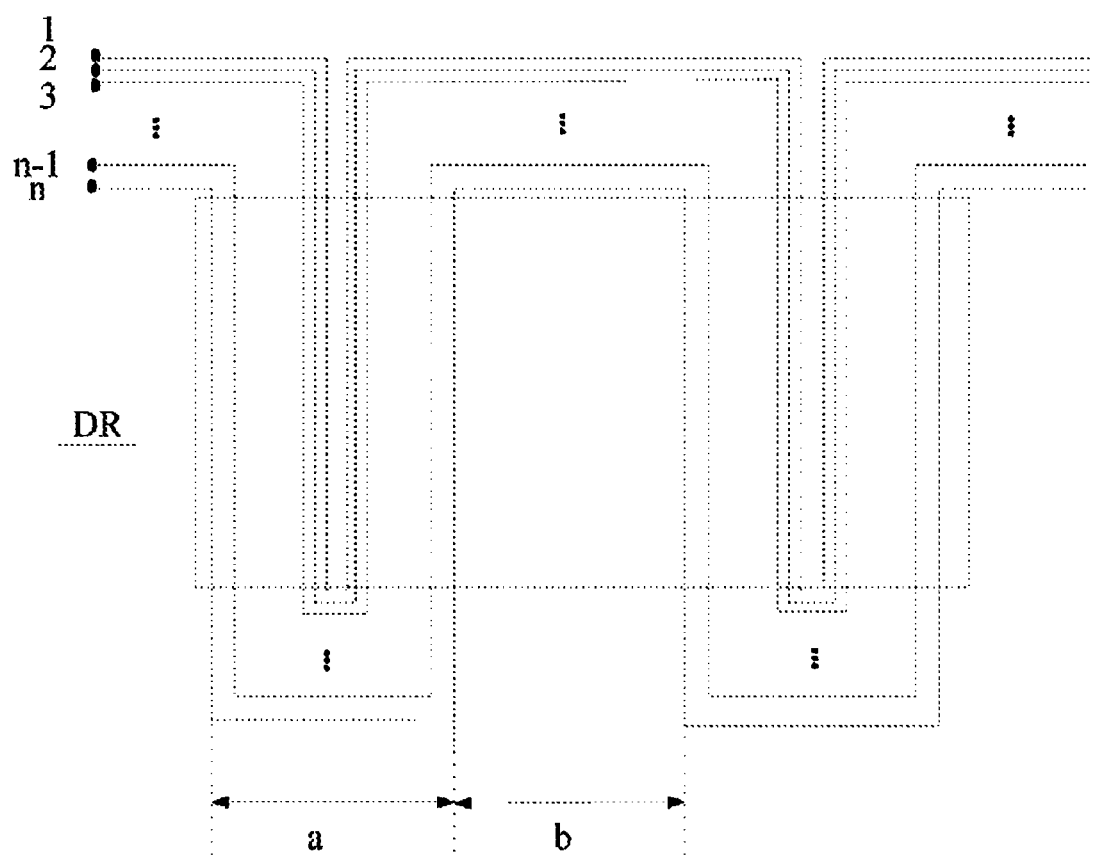
FIG. 8 is a schematic diagram of distribution of a plurality of electrode strips of a liquid crystal grating in embodiment 1 of the present invention.

Specifically, as shown in FIG. 8, the first electrode structure 26 includes n electrode strips 30, wherein n is a positive integer. The plane where the first electrode structure 26 is located includes light transmissive areas (can also be called as grating unit) formed by the projection parts 304 of the electrode strips 30 distributed in parallel and at intervals and non-light transmissive areas with no electrode strip 30. The light transmissive area and the non-light transmissive area compose the driving area DR.

The projection parts 304 of the n electrode strips 30 are arranged towards the projection directions of the projection parts 304 according to such a sequence that the distances between the two driving parts 301 of the projection parts 304 increase sequentially, in FIG. 8, the electrode strips 30 are sequentially arranged towards the lower side (the projection directions of the projection parts 304), beginning from the first electrode strip. That is to say, the distances between the two driving parts 301 of the projection parts 304 are unequal between every two electrode strips 30.

As shown in FIG. 8, the width of the grating unit (the area provided with the electrode strips) is a, and the width of the non-grating unit (the area provided with no electrode strip) is b. According to the sequence of first, second, . . . $n^{th}$, the distances between the two driving parts 301 of the projection parts 304 of the electrode strips 30 increase sequentially, the $n^{th}$ strip has the maximum distance, and the distance between the two driving parts 301 of the $n^{th}$ electrode strip 30 is a.

Preferably, the distances between the projection parts 304 of two adjacent electrode strips 30 are equal.

More preferably, the distances between the center lines of the adjacent projection parts 304 of the electrode strips 30 are equal, in this way, the projection parts 304 of the electrode strips 30 are equal in quantity and corresponding in position, and the electrode strips 30 are regularly arranged in the driving area DR.

As shown in FIG. 8, the connecting parts 302 of all the electrode strips 30 are arranged at the upper side of the driving area DR and are connected with the driving circuit.

In this embodiment, when the liquid crystal grating substrate is used, the electrode strips 30 in a particular area (e.g., the grating unit) of the driving area DR can be energized, the projection parts 304 of the energized electrode strips 30 form the light transmissive areas, and the projection parts 304 of the non-energized electrode strips 30 form the non-light transmissive areas, such that light transmissive areas and non-light transmissive areas distributed at intervals can be formed. When the crosstalk phenomenon is detected, the electrode strips 30 at the two sides of the light transmissive area can be sequentially energized or deenergized to expand the light transmissive area or reduce the light transmissive area so as to reduce the crosstalk phenomenon. It should be understood that, the projection parts 304 of the non-energized electrode strips 30 can also form the light transmissive areas, while the projection parts 304 of the energized electrode strips 30 can form the non-light transmissive areas.

It should be understood that, according to a specific application scenario, the width a of the above-mentioned grating unit and the width b of the non-grating unit can also be adjusted by adjusting the shapes of the electrode strips 30, for example, adjusting the distances between the center lines of the adjacent projection parts 304.

Preferably, the driving circuit respectively configures the voltages of the electrode strips 30. That is to say, the width of the light transmissive area can be freely adjusted within the width range a by the driving circuit.

Figure 5:
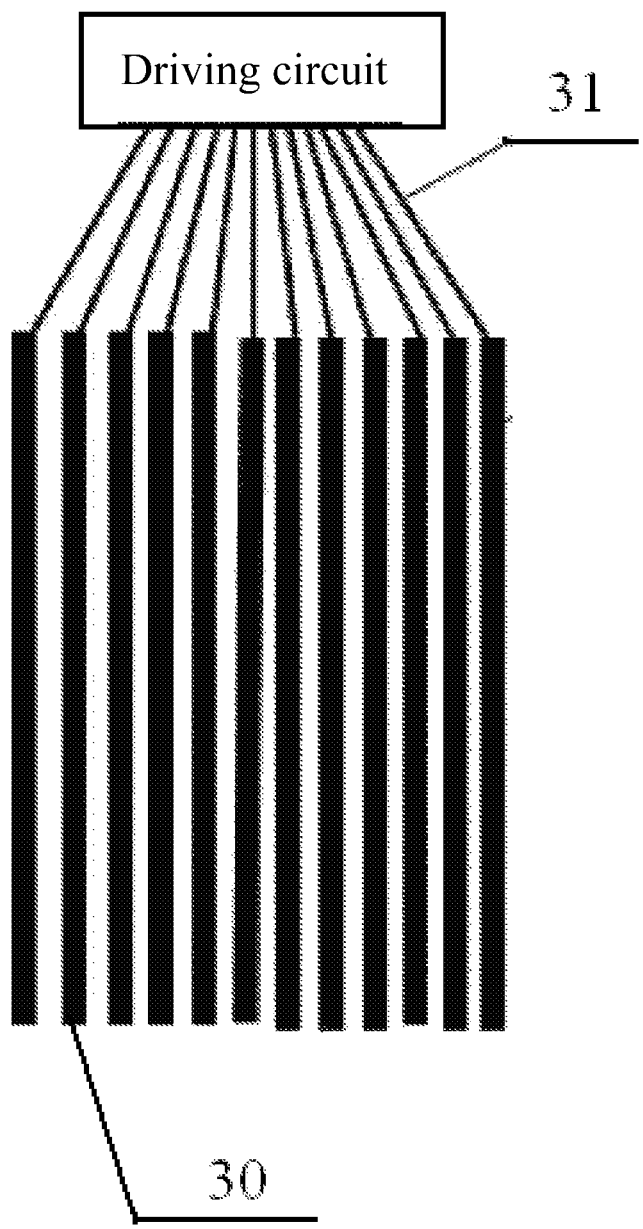
FIG. 5 is a schematic diagram of a structure of a driving circuit of a controllable liquid crystal grating in the prior art.
Figure 6:
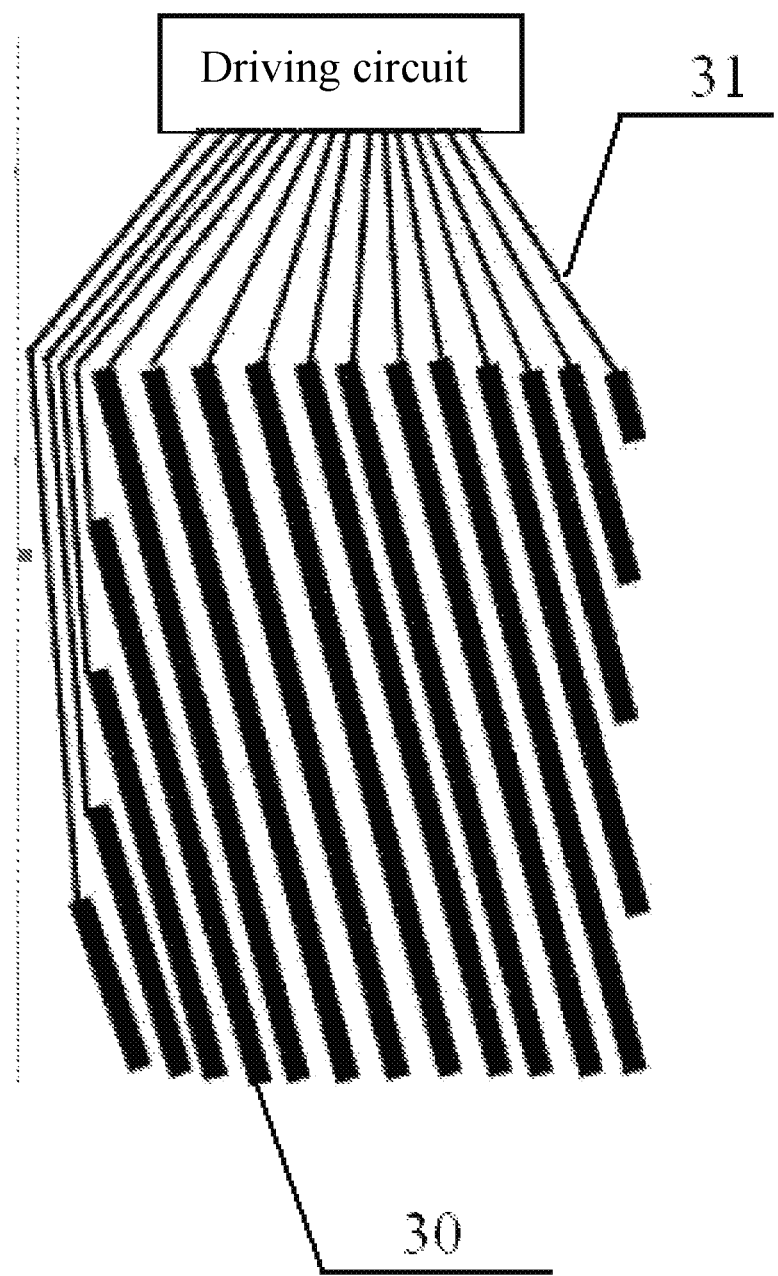
FIG. 6 is a schematic diagram of a structure of another driving circuit of a controllable liquid crystal grating in the prior art.
Figure 7:
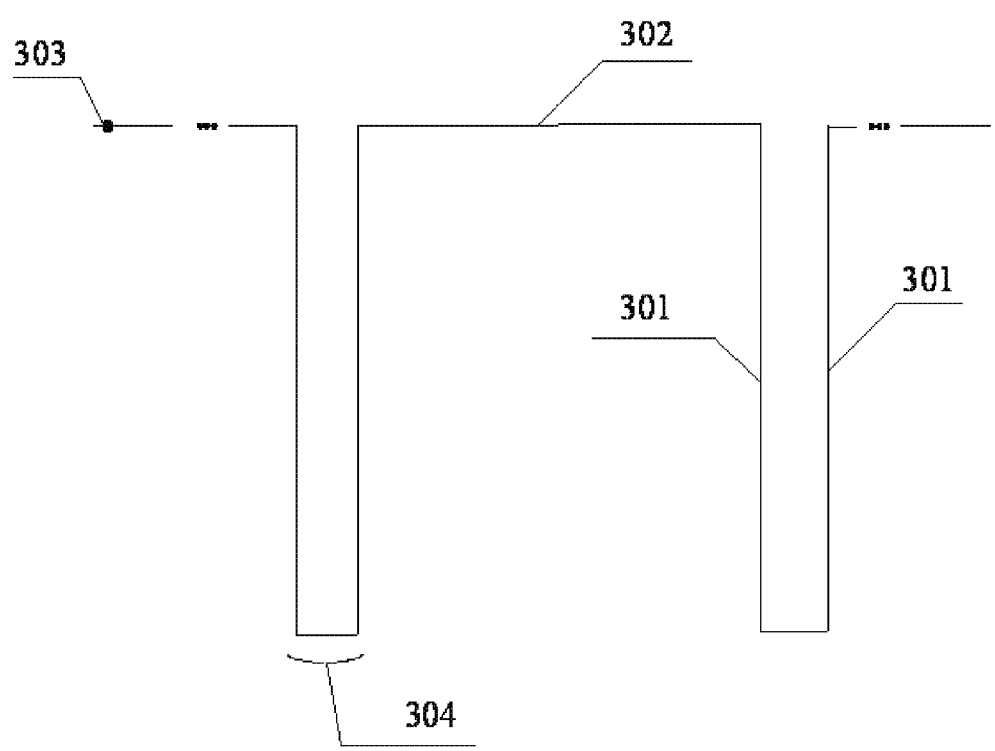
FIG. 7 is a schematic diagram of the shape of a single electrode strip of a liquid crystal grating in embodiment 1 of the present invention.

In the liquid crystal grating substrate of this embodiment, the driving circuit only needs to include n control lines 31. When a driving circuit structure the same as FIG. 5 or FIG. 6 is constructed by using traditional electrode strips 30 distributed at equal intervals, for the grating unit with the same width a, the driving circuit needs to include 2×n control lines 31; it is assumed that the entire liquid crystal grating substrate has m grating units each of which has a width of a, then the driving circuit in the traditional technology needs 2×n×m control lines 31, and the total number of the control lines 31 is 2m times as large as the total number of the control lines 31 of the liquid crystal grating substrate in this embodiment. Compared with the prior art, the number of the control lines 31 of the driving circuit in the present invention is greatly decreased, this is because each electrode strip in this embodiment adopts the following structure: a plurality of projection parts (e.g., m) are included, and each projection part includes two driving parts penetrating through the driving area. Based on this, the driving circuit of the liquid crystal grating substrate in this embodiment is simplified, and meanwhile the processing difficulty of the control lines 31 is reduced.

Figure 2:
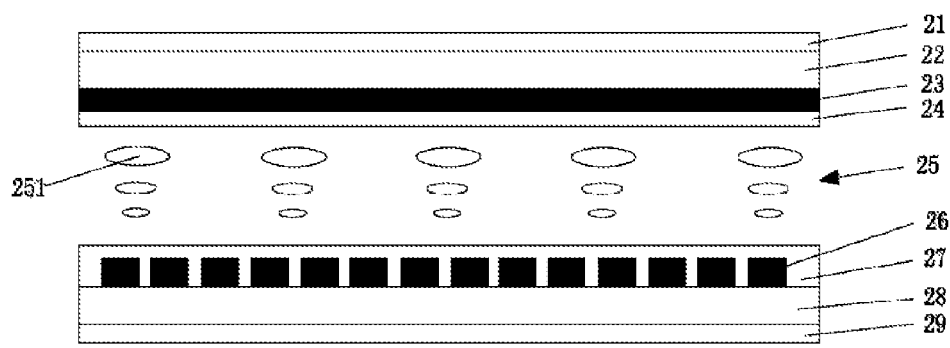
FIG. 2 is a schematic diagram of a structure of a liquid crystal grating.
Figure 3:
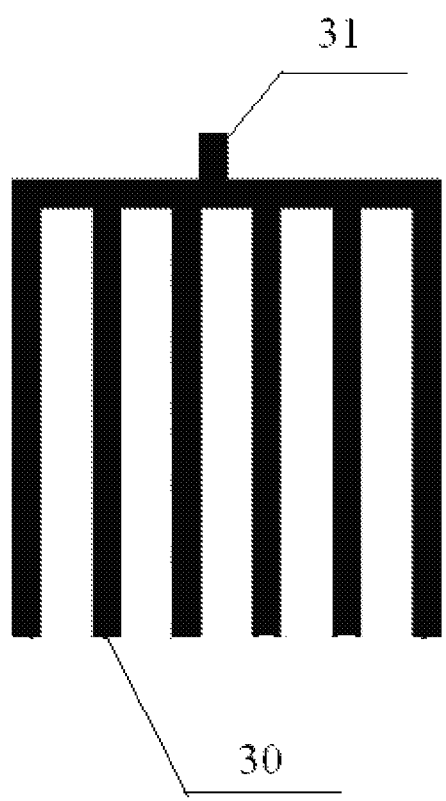
FIG. 3 is a schematic diagram of a structure of a driving circuit of a liquid crystal grating in the prior art.
Figure 4:
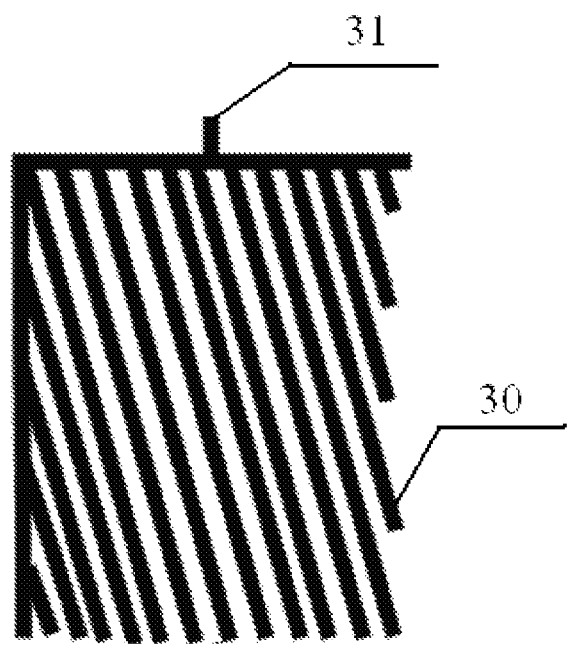
FIG. 4 is a schematic diagram of a structure of another driving circuit of a liquid crystal grating in the prior art.

This embodiment further provides a liquid crystal grating, including a first substrate and a second substrate, which are arranged oppositely, and a liquid crystal layer arranged between the first substrate and the second substrate, the first substrate is the above-mentioned liquid crystal grating substrate, the second substrate includes a second electrode structure, and an electric field is generated between the second electrode structure and the first electrode structure of the first substrate to drive liquid crystal molecules in the liquid crystal layer to deflect. The specific structure thereof is similar to the structure as shown in FIG. 2, can further include such structural units as the alignment layers, the polarizing films and the like as shown in FIG. 2, and will not be repeated redundantly herein.

The liquid crystal grating substrate and the liquid crystal grating in this embodiment can control the voltages of the electrode strips 30 respectively, thereby not only improving the control precision of the liquid crystal grating, but also ensuring diversified control forms to meet various adjustment requirements for the width of the light transmissive area or non-light transmissive area of the liquid crystal grating; meanwhile, the liquid crystal grating is easy to drive and the sizes of the light transmissive areas can be controlled, thus the circuit design difficulty and the production cost are reduced, and the 3D crosstalk problem can be solved.

Embodiment 2

Figure 9:
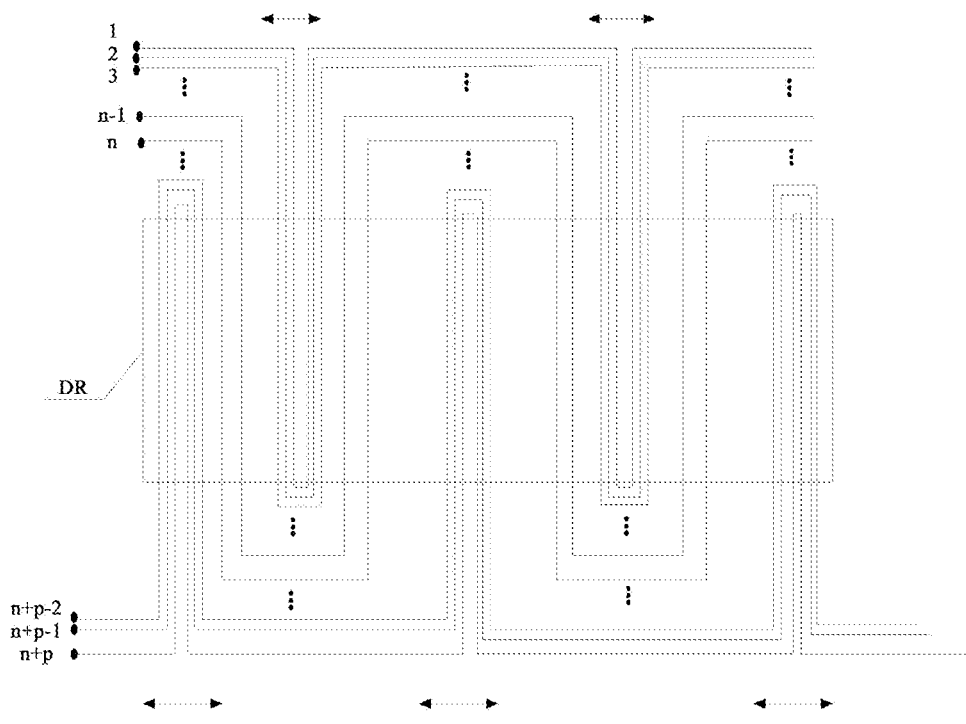
FIG. 9 is a schematic diagram of distribution of a plurality of electrode strips of a liquid crystal grating in embodiment 2 of the present invention.

As shown in FIG. 9, this embodiment provides a liquid crystal grating substrate. The difference of the liquid crystal grating substrate from the liquid crystal grating substrate in embodiment 1 lies in that, p electrode strips 30 (including the $(n+1)^{th}$, $(n+2)^{th}$, $(n+3)^{th}$, ..., $(n+p)^{th}$ electrode strips) are additionally arranged on the basis of the liquid crystal grating substrate in embodiment 1, and the p electrode strips 30 are arranged in the non-grating units with the widths of b in embodiment 1. The projection parts 304 of the p electrode strips 30 are arranged towards the projection directions of the projection parts 304 according to such a sequence that the distances between the two driving parts 301 of the projection parts 304 increase sequentially. In FIG. 9, the electrode strips 30 are sequentially arranged towards the upper side (the projection directions of the projection parts 304), beginning from the $(n+p)^{th}$ electrode strip. That is to say, the distances between the two driving parts 301 of the projection parts 304 of every two electrode strips 30 are unequal.

As shown in FIG. 9, the connecting ends 303 of the p electrode strips 30 are located below the lower side of the driving area DR. Seen from the entirety of the liquid crystal grating substrate as shown in FIG. 9, the connecting ends 303 of the n electrode strips 30 are located above the upper side of the driving area DR, the connecting ends 303 of the p electrode strips 30 are located below the lower side of the driving area DR, and the connecting ends 303 of all the n+p electrode strips 30 are connected with the driving circuit.

In this embodiment, when the liquid crystal grating is used, the electrode strips 30 in a particular area (e.g., the grating unit) of the driving area DR can be energized, the projection parts 304 of the energized electrode strips 30 form the light transmissive areas, and the projection parts 304 of the non-energized electrode strips 30 form the non-light transmissive areas, such that light transmissive areas and non-light transmissive areas distributed at intervals can be formed. When the crosstalk phenomenon is detected, the electrode strips 30 at the two sides of the light transmissive area can be sequentially energized or deenergized to expand the light transmissive area or reduce the light transmissive area so as to suppress the crosstalk phenomenon. It should be understood that, the projection parts 304 of the non-energized electrode strips 30 can also form the light transmissive areas, while the projection parts 304 of the energized electrode strips 30 can form the non-light transmissive areas.

The liquid crystal grating in this embodiment is an full-area adjustable liquid crystal grating, and compared to the liquid crystal grating with fixed non-grating units (i.e., used as inherent non-light transmissive areas) in embodiment 1, the liquid crystal grating can be adjusted more flexibly to adapt to various adjustment requirements for the width of the light transmissive area or the non-light transmissive area of the liquid crystal grating.

In the liquid crystal grating substrate of this embodiment, the driving circuit only needs to include (n+p) control lines 31. When a driving circuit structure the same as FIG. 5 or FIG. 6 is constructed by using traditional electrode strips 30 distributed at equal intervals, for the grating unit with the same width (a+b), the driving circuit needs to include 2×(n+p) control lines 31; it is assumed that the entire liquid crystal grating substrate has m grating units with widths of a+b, then the driving circuit in the traditional technology needs 2×(n+p)×m control lines 31, and the total number of the control lines 31 is 2m times as large as the total number of the control lines 31 of the liquid crystal grating substrate in this embodiment. Compared with the prior art, the number of the control lines 31 of the driving circuit in the present invention is greatly decreased, this is because each electrode strip in this embodiment adopts the following structure: a plurality of projection parts (e.g., m projection parts) is included, and each projection part includes two driving parts penetrating through the driving area. Based on this, the driving circuit of the liquid crystal grating substrate in this embodiment is simplified, and meanwhile the processing difficulty of the control lines 31 is reduced.

This embodiment further provides a liquid crystal grating, including a first substrate and a second substrate, which are arranged oppositely, and a liquid crystal layer arranged between the first substrate and the second substrate, the first substrate is the above-mentioned liquid crystal grating substrate, the second substrate includes a second electrode structure, and an electric field is generated between the second electrode structure and the first electrode structure of the first substrate to drive liquid crystal molecules in the liquid crystal layer to deflect. The specific structure thereof is similar to the structure as shown in FIG. 2, can further include such structural units as the alignment layers, the polarizing films and the like as shown in FIG. 2, and will not be repeated redundantly herein.

The liquid crystal grating substrate and the liquid crystal grating in this embodiment can control the voltages of the electrode strips 30 respectively, thereby not only improving the control precision of the liquid crystal grating, but also ensuring diversified control forms to meet various adjustment requirements for the width of the light transmissive area or non-light transmissive area of the liquid crystal grating; meanwhile, the liquid crystal grating is easy to drive and the sizes of the light transmissive areas can be controlled, thus the circuit design difficulty and the production cost are reduced, and the 3D crosstalk problem can be solved.

Embodiment 3

This embodiment provides a stereoscopic display device, including the above-mentioned liquid crystal grating.

Figure 10:
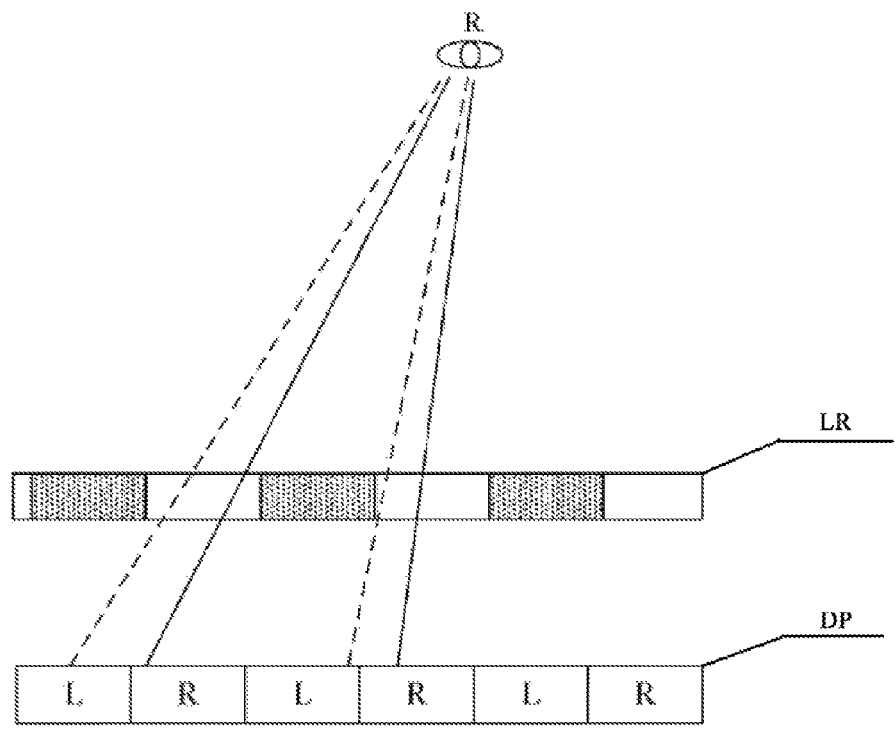
FIG. 10 is a schematic diagram of a light path when generating left and right eye crosstalk of a stereoscopic display device with a liquid crystal grating in embodiment 3 of the present invention.

In a 3D display process using the liquid crystal grating LR, the principle of generating crosstalk is as shown in FIG. 10. Since the width of the light transmissive area of the liquid crystal grating LR is unreasonable, a large error is occurred between a ideal light transmission path and the actual light transmission path, causing left eye image information (L) to enter the right eye of a viewer to result in confusion of pictures, namely the crosstalk phenomenon.

How to reduce the left eye and right eye crosstalk problem by using the liquid crystal grating LR with controllable light transmissive areas in the present invention will be described below.

Figure 11:
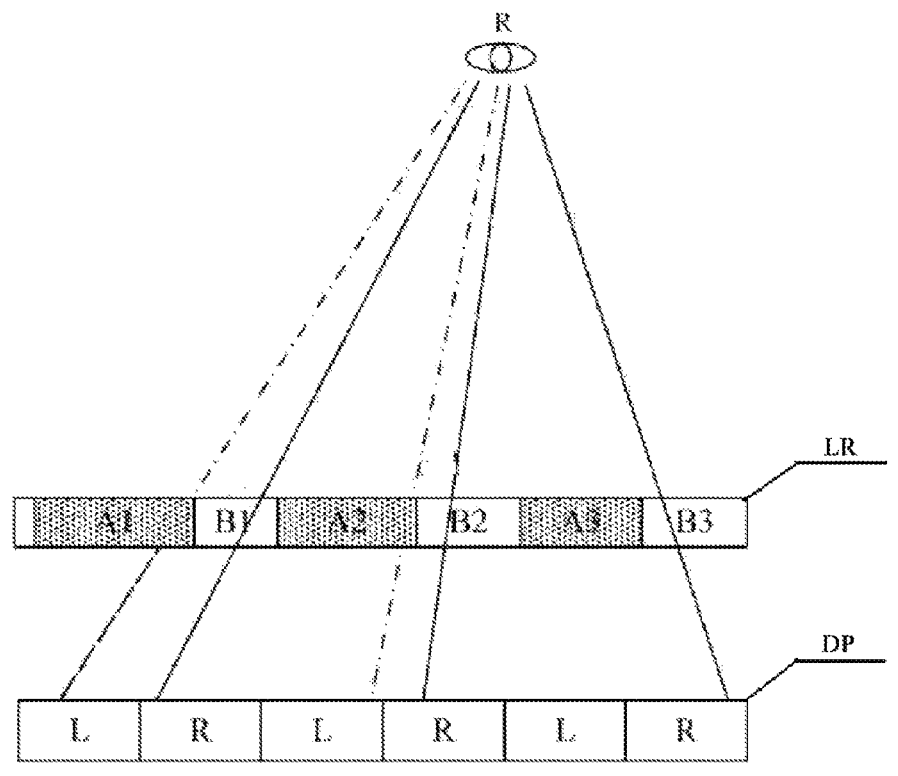
FIG. 11 is a schematic diagram of a light path when eliminating left and right eye crosstalk of a stereoscopic display device with a liquid crystal grating in embodiment 3 of the present invention.

The liquid crystal grating LR with the controllable light transmissive areas in the present invention can be used for solving the above-mentioned crosstalk problem of the left and right eye image information. As shown in FIG. 11, the widths of the light transmissive areas or the non-light transmissive areas of the liquid crystal grating LR are adjusted to suppress the crosstalk phenomenon in a 3D display mode. A plurality of electrode strips 30 are sequentially energized or deenergized to change the relative widths of the light transmissive areas A1, A2, A2 and the non-light transmissive areas B1, B2, B3 of the liquid crystal grating LR, so as to block the left eye image information from entering the right eye, thus the capability of the liquid crystal grating LR of separating the left and right eye image information is improved, and the crosstalk phenomenon can be suppressed.

Figure 12:
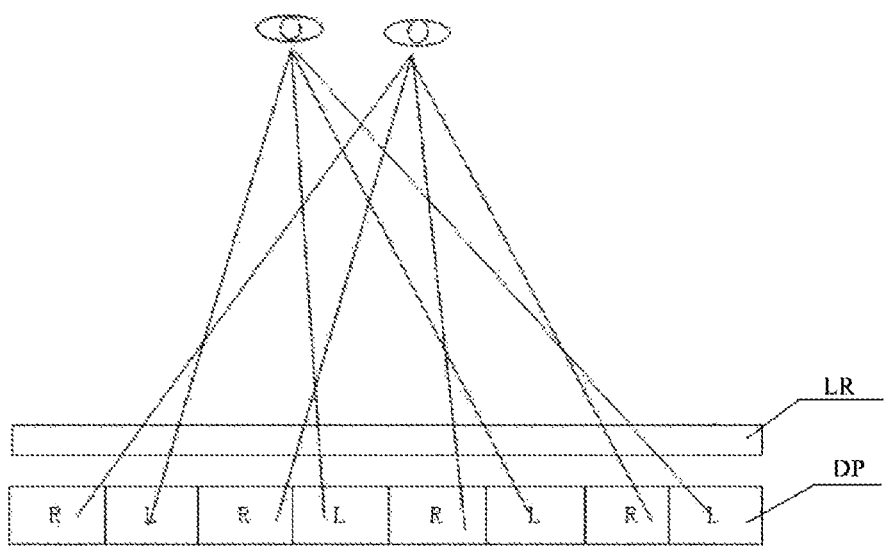
FIG. 12 is a schematic diagram of a light path when switching to 2D display of a stereoscopic display device with a liquid crystal grating in embodiment 3 of the present invention.

It should be understood that, the above-mentioned stereoscopic display device can also be switched between a 2D display and a 3D display. As shown in FIG. 12, the deflection angle of the liquid crystal is adjusted and controlled in combination with the transmission directions of the second polarizing film and the first polarizing film, such that the liquid crystal grating LR is in a normally on mode under the energized or non-energized condition, at this time, the display panel DP is in a 2D display mode.

The stereoscopic display device in this embodiment can be not only used for solving the problem of crosstalk between the left and right eyes in 3D display, but also can be switched between a 2D display and a 3D display.

It can be understood that, the foregoing implementations are merely exemplary implementations used for illustrating the principle of the present invention, rather than limiting the present invention. Those of ordinary skill in the art may make various variations and improvements without departing from the spirit and essence of the present invention, and these variations and improvements should be encompassed in the protection scope of the present invention.

The invention claimed is:

1. A liquid crystal grating substrate, comprising a driving area used for forming a grating, wherein the liquid crystal grating substrate is provided with a first electrode structure, the first electrode structure comprises a plurality of electrode strips, and each electrode strip of the plurality of electrode strips comprises:
    a plurality of connecting parts arranged outside one side of the driving area, a projection part penetrating through the driving area arranged between every two adjacent connecting parts, and each projection part is provided with two mutually parallel driving parts arranged in the driving area; each of the two mutually parallel driving parts of all the projection parts are mutually parallel; and one end of each of the two mutually parallel driving parts in each projection part is connected with one end of a connecting part adjacent thereto;
    wherein one end of each electrode strip of the plurality of electrode strips is a connecting end, the connecting end is used for connecting a driving circuit, and the driving circuit is used for providing a driving voltage for the plurality of electrode strips; and
    the projection parts of the plurality of electrode strips have a same projection direction, and the projection parts of the plurality of electrode strips are arranged towards the projection direction of the projection parts according to a sequence such that distances between the two mutually parallel driving parts of the projection parts increase sequentially, and the projection part of one electrode strip of two adjacent electrode strips is arranged inside of the projection part of the other electrode strip of the two adjacent electrode strips.

2. The liquid crystal grating substrate of claim 1, wherein distances between the projection parts of every two adjacent electrode strips in the plurality of electrode strips are equal.

3. The liquid crystal grating substrate of claim 1, wherein distances between the center lines of the adjacent projection parts of the plurality of electrode strips are equal.

4. The liquid crystal grating substrate of claim 1, wherein the connecting parts of all the plurality of electrode strips are arranged on one side of the driving area, or
    connecting parts of a part of the plurality of electrode strips are arranged at one side of the driving area, and connecting parts of the rest of the plurality of electrode strips are arranged at the other side of the driving area opposite to the one side.

5. The liquid crystal grating substrate of claim 1, wherein the driving circuit configures the voltages of the plurality of electrode strips respectively.

6. A liquid crystal grating, comprising a first substrate and a second substrate, which are arranged oppositely, and a liquid crystal layer arranged between the first substrate and the second substrate, wherein the first substrate is a liquid crystal grating substrate, and the liquid crystal grating substrate comprising a driving area used for forming a grating, wherein the liquid crystal grating substrate is provided with a first electrode structure, the first electrode structure comprises a plurality of electrode strips, and each electrode strip of the plurality of electrode strips comprises: a plurality of connecting parts arranged outside one side of the driving area, a projection part penetrating through the driving area arranged between every two adjacent connecting parts, and each projection part is provided with two mutually parallel driving parts arranged in the driving area; each of the two mutually parallel driving parts of all the projection parts are mutually parallel; and one end of each of the two mutually parallel driving parts in each projection part is connected with one end of a connecting part adjacent thereto; wherein one end of each electrode strip of the plurality of electrode strips is a connecting end, the connecting end is used for connecting a driving circuit, and the driving circuit is used for providing a driving voltage for the plurality of electrode strips;
    the second substrate comprises a second electrode structure, and an electric field is generated between the second electrode structure and the first electrode structure of the first substrate to drive liquid crystal molecules in the liquid crystal layer to deflect; and
    the projection parts of the plurality of electrode strips have a same projection direction, and the projection parts of the plurality of electrode strips are arranged toward the projection direction of the projection parts according to a sequence such that distances between the two mutually parallel driving parts of the projection parts increase sequentially, and the projection part of one electrode strip of two adjacent electrode strips is arranged inside of the projection part of the other electrode strip of the two adjacent electrode strips.

7. The liquid crystal grating of claim 6, wherein distances between the projection parts of every two adjacent electrode strips in the plurality of electrode strips are equal.

8. The liquid crystal grating of claim 6, wherein distances between the center lines of the adjacent projection parts of the plurality of electrode strips are equal.

9. The liquid crystal grating of claim 6, wherein the connecting parts of all the plurality of electrode strips are arranged on one side of the driving area, or
    connecting parts of a part of the plurality of electrode strips are arranged at one side of the driving area, and connecting parts of the rest of the plurality of electrode strips are arranged at the other side of the driving area opposite to the one side.

10. The liquid crystal grating of claim 6, wherein the driving circuit configures the voltages of the plurality of electrode strips respectively.

11. A stereoscopic display device, comprising a display panel, wherein a liquid crystal grating is arranged outside the light output surface of the display panel, and
    the liquid crystal grating comprising a first substrate and a second substrate, which are arranged oppositely, and a liquid crystal layer arranged between the first substrate and the second substrate, wherein the first substrate is a liquid crystal grating substrate, and the liquid crystal grating substrate comprising a driving area used for forming a grating, wherein the liquid crystal grating substrate is provided with a first electrode structure, the first electrode structure comprises a plurality of electrode strips, and each electrode strip of the plurality of electrode strips comprises: a plurality of connecting parts arranged outside one side of the driving area, a projection part penetrating through the driving area arranged between every two adjacent connecting parts, and each projection part is provided with two mutually parallel driving parts arranged in the driving area; each of the two mutually parallel driving parts of all the projection parts are mutually parallel; and one end of each of the two mutually parallel driving parts in each projection part is connected with one end of a connecting part adjacent thereto; wherein one end of each electrode strip of the plurality of electrode strips is a connecting end, the connecting end is used for connecting a driving circuit, and the driving circuit is used for providing a driving voltage for the plurality of electrode strips;

the second substrate comprises a second electrode structure, and an electric field is generated between the second electrode structure and the first electrode structure of the first substrate to drive liquid crystal molecules in the liquid crystal layer to deflect; and the projection parts of the plurality of electrode strips have a same projection direction, and the projection parts of the plurality of electrode strips are arranged towards the projection direction of the projection parts according to a sequence such that distances between the two mutually parallel driving parts of the projection parts increase sequentially, and the projection part of one electrode strip of two adjacent electrode strips is arranged inside of the projection part of the other electrode strip of the two adjacent electrode strips.

12. The stereoscopic display device of claim 11, wherein distances between the projection parts of every two adjacent electrode strips in the plurality of electrode strips are equal.

13. The stereoscopic display device of claim 11, wherein distances between the center lines of the adjacent projection parts of the plurality of electrode strips are equal.

14. The stereoscopic display device of claim 11, wherein the connecting parts of all the plurality of electrode strips are arranged on one side of the driving area, or connecting parts of a part of the plurality of electrode strips are arranged at one side of the driving area, and connecting parts of the rest of the plurality of electrode strips are arranged at the other side of the driving area opposite to the one side.

15. The stereoscopic display device of claim 11, wherein the driving circuit configures the voltages of the plurality of electrode strips respectively.

* * * * *